(12) United States Patent
Laor

(10) Patent No.: US 8,108,251 B2
(45) Date of Patent: *Jan. 31, 2012

(54) METHOD OF AND SYSTEM FOR MANAGING PROMOTIONS FOR PURCHASE TRANSACTIONS OVER A NETWORK

(75) Inventor: Raviv Laor, New York, NY (US)

(73) Assignee: Catalina Marketing Corporation, St. Petersburg, FL (US)

( * ) Notice: Subject to any disclaimer, the term of this patent is extended or adjusted under 35 U.S.C. 154(b) by 609 days.

This patent is subject to a terminal disclaimer.

(21) Appl. No.: 12/144,557

(22) Filed: Jun. 23, 2008

(65) Prior Publication Data

US 2008/0281680 A1    Nov. 13, 2008

Related U.S. Application Data

(63) Continuation of application No. 09/595,677, filed on Jun. 19, 2000, now Pat. No. 7,599,850.

(51) Int. Cl.
*G06Q 30/00* (2006.01)
(52) U.S. Cl. ......................................................... 705/14
(58) Field of Classification Search .................... 705/14
See application file for complete search history.

(56) References Cited

U.S. PATENT DOCUMENTS

| | | | |
|---|---|---|---|
| 3,426,326 A | 2/1969 | Goldstein | |
| 3,737,631 A | 6/1973 | Harris | |
| 3,770,941 A | 11/1973 | Gechele et al. | |
| 3,771,132 A | 11/1973 | Biewer | |
| 3,899,775 A | 8/1975 | Larsen | |
| 3,959,624 A | 5/1976 | Kaslow | |
| 4,002,886 A | 1/1977 | Sundelin | |
| 4,419,573 A | 12/1983 | Von Geldern | |
| 4,554,446 A | 11/1985 | Murphy et al. | |
| 4,674,041 A | 6/1987 | Lemon et al. | |
| 4,787,037 A | 11/1988 | Ootsuka | |
| 4,791,281 A | 12/1988 | Johnsen et al. | |
| 4,833,308 A | 5/1989 | Humble | |
| 4,843,546 A | 6/1989 | Yoshida et al. | |
| 4,882,675 A | 11/1989 | Nichtberger et al. | |
| 4,887,208 A | 12/1989 | Schneider et al. | |
| 4,949,256 A | 8/1990 | Humble | |

(Continued)

FOREIGN PATENT DOCUMENTS

EP    0 512 509 A2    11/1992

(Continued)

OTHER PUBLICATIONS

Jun. 15, 1989, "In this Computer Age, Who Needs Coupons?" The New York Times.

(Continued)

*Primary Examiner* — John Van Bramer
(74) *Attorney, Agent, or Firm* — Pillsbury Winthrop Shaw Pittman LLP

(57) ABSTRACT

A system for managing promotions over a network includes a promotion server system having a computer processor and associated datastore, the datastore containing data representative of terms and statistics of one or more item promotions, and a commercial server system including a computer processor, the commercial server system being selectively coupleable to the promotion server system over the network. The promotion server system includes promotion code for transferring, to the commercial server system, the data representative of the terms and statistics of the promotions.

18 Claims, 17 Drawing Sheets

U.S. PATENT DOCUMENTS

| | | | |
|---|---|---|---|
| 4,972,504 | A | 11/1990 | Daniel, Jr. et al. |
| 5,025,372 | A | 6/1991 | Burton et al. |
| 5,056,019 | A | 10/1991 | Schultz et al. |
| 5,060,185 | A | 10/1991 | Naito et al. |
| 5,117,355 | A | 5/1992 | McCarthy |
| 5,119,294 | A | 6/1992 | Tanaka |
| 5,128,752 | A | 7/1992 | Von Kohorn |
| 5,128,861 | A | 7/1992 | Kagami et al. |
| 5,168,445 | A | 12/1992 | Kawashima et al. |
| 5,173,851 | A | 12/1992 | Off et al. |
| 5,185,695 | A | 2/1993 | Pruchnicki |
| 5,193,056 | A | 3/1993 | Boes |
| 5,202,826 | A | 4/1993 | McCarthy |
| 5,227,874 | A | 7/1993 | Von Kohorn |
| 5,237,496 | A | 8/1993 | Kagami et al. |
| 5,237,499 | A | 8/1993 | Garback |
| 5,245,533 | A | 9/1993 | Marshall |
| 5,249,044 | A | 9/1993 | Von Kohorn |
| 5,256,863 | A | 10/1993 | Ferguson et al. |
| 5,285,278 | A | 2/1994 | Holman |
| 5,287,181 | A | 2/1994 | Holman |
| 5,287,268 | A | 2/1994 | McCarthy |
| 5,305,195 | A | 4/1994 | Murphy |
| 5,305,197 | A | 4/1994 | Axler et al. |
| 5,305,199 | A | 4/1994 | Lobiondo et al. |
| 5,315,093 | A | 5/1994 | Stewart |
| 5,331,544 | A | 7/1994 | Lu et al. |
| 5,337,253 | A | 8/1994 | Berkovsky et al. |
| 5,347,632 | A | 9/1994 | Filepp et al. |
| 5,353,218 | A | 10/1994 | De Lapa et al. |
| 5,367,452 | A | 11/1994 | Gallery et al. |
| 5,368,129 | A | 11/1994 | Von Kohorn |
| 5,377,095 | A | 12/1994 | Maeda et al. |
| 5,380,991 | A | 1/1995 | Valencia et al. |
| 5,396,417 | A | 3/1995 | Burks et al. |
| 5,401,946 | A | 3/1995 | Weinblatt |
| 5,406,475 | A | 4/1995 | Kouchi et al. |
| 5,420,606 | A | 5/1995 | Begum et al. |
| 5,448,471 | A | 9/1995 | Deaton et al. |
| 5,459,306 | A | 10/1995 | Stein et al. |
| 5,483,049 | A | 1/1996 | Schulze, Jr. |
| 5,502,636 | A | 3/1996 | Clarke |
| 5,515,098 | A | 5/1996 | Carles |
| 5,557,518 | A | 9/1996 | Rosen |
| 5,557,721 | A | 9/1996 | Fite et al. |
| 5,572,643 | A | 11/1996 | Judson |
| 5,612,868 | A | 3/1997 | Off et al. |
| 5,621,812 | A | 4/1997 | Deaton |
| 5,644,723 | A | 7/1997 | Deaton |
| 5,649,114 | A | 7/1997 | Deaton |
| 5,687,322 | A | 11/1997 | Deaton |
| 5,701,451 | A | 12/1997 | Rogers et al. |
| 5,706,507 | A | 1/1998 | Schloss |
| 5,708,782 | A | 1/1998 | Larson et al. |
| 5,710,886 | A | 1/1998 | Christensen et al. |
| 5,712,979 | A | 1/1998 | Graber et al. |
| 5,715,399 | A | 2/1998 | Bezos |
| 5,717,860 | A | 2/1998 | Graber et al. |
| 5,740,549 | A | 4/1998 | Reilly et al. |
| 5,752,246 | A | 5/1998 | Rogers et al. |
| 5,754,939 | A | 5/1998 | Herz et al. |
| 5,761,648 | A | 6/1998 | Golden et al. |
| 5,774,868 | A | 6/1998 | Cragun et al. |
| 5,794,207 | A | 8/1998 | Walker et al. |
| 5,806,044 | A | 9/1998 | Powell |
| 5,812,769 | A | 9/1998 | Graber et al. |
| 5,819,241 | A | 10/1998 | Reiter |
| 5,822,735 | A | 10/1998 | Delapa |
| 5,832,457 | A | 11/1998 | O'Brien et al. |
| 5,845,259 | A | 12/1998 | West et al. |
| 5,848,396 | A * | 12/1998 | Gerace .................. 705/7.33 |
| 5,855,007 | A | 12/1998 | Jovicic et al. |
| 5,857,175 | A | 1/1999 | Day et al. |
| 5,878,222 | A | 3/1999 | Harrison |
| 5,884,278 | A | 3/1999 | Powell |
| 5,887,271 | A | 3/1999 | Powell |
| 5,890,137 | A | 3/1999 | Koreeda |
| 5,903,874 | A | 5/1999 | Leonard et al. |
| 5,905,246 | A | 5/1999 | Fajkowski |
| 5,907,830 | A | 5/1999 | Engel |
| 5,909,673 | A | 6/1999 | Gregory |
| 5,916,024 | A | 6/1999 | Von Kohorn |
| 5,918,213 | A | 6/1999 | Bernard et al. |
| 5,926,795 | A | 7/1999 | Williams |
| 5,933,811 | A | 8/1999 | Angles |
| 5,948,061 | A | 9/1999 | Merriman et al. |
| 5,950,173 | A | 9/1999 | Perkowski |
| 5,956,027 | A | 9/1999 | Krishnamurthy |
| 5,956,695 | A | 9/1999 | Carrithers et al. |
| 5,970,469 | A | 10/1999 | Scroggie et al. |
| 5,974,399 | A | 10/1999 | Giuliani et al. |
| 5,978,013 | A | 11/1999 | Jones et al. |
| 6,006,197 | A | 12/1999 | D'eon |
| 6,009,411 | A | 12/1999 | Kepecs |
| 6,012,038 | A | 1/2000 | Powell |
| 6,014,634 | A | 1/2000 | Scroggie et al. |
| 6,021,362 | A | 2/2000 | Maggard et al. |
| 6,026,370 | A | 2/2000 | Jermyn |
| 6,039,244 | A | 3/2000 | Finsterwald |
| 6,041,308 | A | 3/2000 | Walker et al. |
| 6,041,309 | A * | 3/2000 | Laor .................. 705/14.26 |
| 6,049,778 | A | 4/2000 | Walker et al. |
| 6,055,513 | A | 4/2000 | Katz et al. |
| 6,061,660 | A | 5/2000 | Eggleston et al. |
| 6,073,105 | A | 6/2000 | Sutcliffe et al. |
| 6,075,971 | A | 6/2000 | Williams et al. |
| 6,076,069 | A | 6/2000 | Laor |
| 6,141,010 | A | 10/2000 | Hoyle |
| 6,230,143 | B1 | 5/2001 | Simons et al. |
| 6,266,649 | B1 | 7/2001 | Linden et al. |
| 2001/0032126 | A1 | 10/2001 | Macartney-Filgate et al. |
| 2001/0037241 | A1 | 11/2001 | Puri |
| 2002/0046091 | A1 | 4/2002 | Mooers et al. |

FOREIGN PATENT DOCUMENTS

| | | |
|---|---|---|
| JP | 11-143966 | 5/1999 |
| JP | 11-175851 | 7/1999 |
| JP | 2001-504252 | 3/2001 |
| WO | WO 93/15466 | 8/1993 |
| WO | WO 94/27231 | 11/1994 |
| WO | WO 95/16971 | 6/1995 |
| WO | WO 97/055555 | 2/1997 |
| WO | WO 97/23838 | 7/1997 |
| WO | WO 99/12115 | 3/1999 |

OTHER PUBLICATIONS

Dec. 1992, "Interactive Cable System Receives Strong Response" Direct Marketing, pp. 9-10.

May 9, 1994, "SLED Internet Directory Distributes Electronic Coupons" PR Newswire.

May 16, 1994, "SLED InterNIC Debut Internet Services" PC Week p. 130.

May 1994, David Bank "Email Marketing Firm Using Discount Strategy" San Jose Mercury News.

Sep. 25, 1995, Kelly Shermach "Electronic Coupon Program Offers Database Potential" Marketing News.

Dec. 8, 1005, H.G. Lewis "Cruising Down the Hyper-er Space Road: How to Write copy for the (GULP!) Internet" Direct Marketing, vol. 58 No.8, pp. 14-15.

Feb. 11, 1996, "Catalina Marketing Online Launch to Include More than 1,6000 California Stores" Catalina Marketing Corporation Newsletter.

Apr. 19, 2996, "San Jose Customers Can Now Plan Supermarket Shopping in Cyberspace—New Internet Service Saves Shoppers Time and Money" Catalina Marketing Corporation Newsletter.

Apr. 19, 1996, "Cruisign for Food Svings on the Internet" San Diego Union-Tribune, p. C1.

Jun. 1, 2996, Laurie Petersen "Click Here for Coupons" Direct p. 45.

Jun. 13, 1996, "PNC Bank Announces Internet Site, Plans Comprehensive Service Expansion" Business Week.

Nov. 4, 1996, John Fontant "$2^{nd}$ Net Bank Opens for Business" Communicationsweek p. 46.

Apr. 1997, R. Resnick "The Case for 'Opt In' Marketing on the Internet" Direct Marketing, vol. 59, No. 12 pp. 52-53.

Aug. 5, 1997, "Internet Coupon Security Breakthrough Removes Major Obstacle to Online Packaged Goods Advertising" SuperMarkets Online.

Dec. 1, 1997, "Internet and Food Industries Embrace Secure Online Coupon Format" SuperMarkets Online.

Sep. 30, 1998, "IntelliQuest and Coolsavings Offer Innovative Online Customer Relationship Management Program for Vendors" Business Wire.

Oct. 20, 1998, "IntelliQuest Looks for Interaction with Loyalty, Web Traffic Programs" Electronic Advertising & Marketplace Report.

Mar. 1999, www.freesamples.com. Reprinted on Oct. 3, 2001, by Rebecca Brimmer on behalf of applicant, since the original copy could not be found.

International Search Report for PCT/US96/20497, International Filing Date Dec. 23, 1996. Priority Date Dec. 26, 1995.

International Search Report for PCT/US01/19204, International filing Date Jun. 15, 2001. Priority Date Jun. 19, 2000.

"Webster's II New Riverside Dictionary", 1988, Riverside Publishing Company, p. 942.

2000, Shopping bots: Intelligent shopper or virtual department store? by Jennifer Rowley from International Journal of Retail & Distribution Management v28n7 pp. 297-306.

Carlene A. Thissen, "Clearing Up Questions in Coupons Clearing"; submitted in parent U.S. Appl. No. 09/595,677, filed Jun. 19, 2000 via IDS filed Oct. 11, 2001.

International Search Report PCT/US01/14890.

International Preliminary Examination Report PCT/US01/14890.

International Search Report for PCT/US01/19204, International Filing Date Jun. 15, 2001. Priority Date Jun. 19, 2000.

"Webster's II New Riverside Dictionary", 1988, Riverside Publishing Company, p. 942.

Shopping bots: Intelligent shopper or virtual department store? by Jennifer Rowley from International Journal of Retail & Distribution Management v28n4 pp. 297-306.

Carlene A. Thissen, "Clearing Up Questions in Coupon Clearing"; submitted in parent U.S. Appl. No. 09/595,677, filed Jun. 19, 2000 via IDS filed Oct. 11, 2001.

International Preliminary Examination Report PCT/US01/14890.

Internation Preliminary Examination Report PCT/US01/14890.

English translation of office action mailed Aug. 24, 2010 in associated application JP 2002-503757.

Patent Abstracts of Japan for Publication No. 11-175851.

English translation of office action in related case JP Application No. 2002-503757, dated Mar. 8, 2011.

May 28, 1999, Patent Abstracts of Japan for Publication No. 11-143966.

Commerce Solution Shopping System Mass Customization Mechanism Hitachi, Ltd., Mar. 31, 1999, 1$^{st}$ edition, pp. 1-14, 49-71, 157-164.

Jul. 2, 1999, Patent Abstracts of Japan for Publication No. 11-175851.

* cited by examiner

Partner Resource Center

Home | Promotions | Reports
Manage | Authorize                              252

Demo User - Demo Retailer
                            Manage                              Log Off
254                       (Customize)

256          258
                                   260      264
Creation Date    Promotion Status   View as
[All Dates ▽]    [Any Status ▽]    [Text ▽]    Site: Demo Site    [Refresh]

[Title ▽]        [Contains ▽]       [        ]
    262

Promotion
   ID    Title                          Site        Start       Stop       Status    Actions
  6091  Buy 1 Demo Cola get US$0.20 off.  Demo Site  03-15-2000  04-19-2000  Active   Stats,
                                                                                      Pull   268

6094  Buy 1 Demo Product get US$0.10 off. Demo Site  04-01-2000  05-31-2000  Inactive  Stats
                                                                                          270

6192  Get 1 Demo Product free.        Demo Site  03-27-2000  05-31-2000  Active   Stats,
                                                                                     Pull
              266

FIG. 4

Partner Resource Center

Home | Promotions | Reports
Manage | Authorize

View Stats

272

Demo User - Demo Retailer
Log Off

Buy 1 Demo Cola get US$0.20 off.    Site: Demo Site

| | ID | Start | Stop | Rule |
|---|---|---|---|---|
| Buy 1 get 20 cents off | 6091 | 03-15-2000 | 04-19-2000 | Buy 1, get US$0.20 discount. |

| Issued | Viewed | Clicked | Redeemed | Purchased | Saved |
|---|---|---|---|---|---|
| 10,000 | 30,829 | 15,635 | 10,074 | $31,820.00 | $1,695.00 |

| Clicked/Viewed | Redeemed/Viewed | Redeemed/Clicked |
|---|---|---|
| 50.72% | 32.68% | 64.43% |

| Purchases/Viewed | Purchases/Clicked | Purchases/Redeemed |
|---|---|---|
| $1.03 | $2.04 | $3.16 |

276 Promotion's List

[ Buy 1 Demo Cola get US$0.20 off. (6091) ▽ ]

Data Ranges           Graph Type /280       Graph Data      282      274
[ Promotion's Life ▽ ]   ⦿ Counters         ☑ Views
278                      ○ Values           ☑ Clicks
                                            ☑ Redeems
[ Redraw ]                                  ☑ Purchases
                                            ☑ Saves

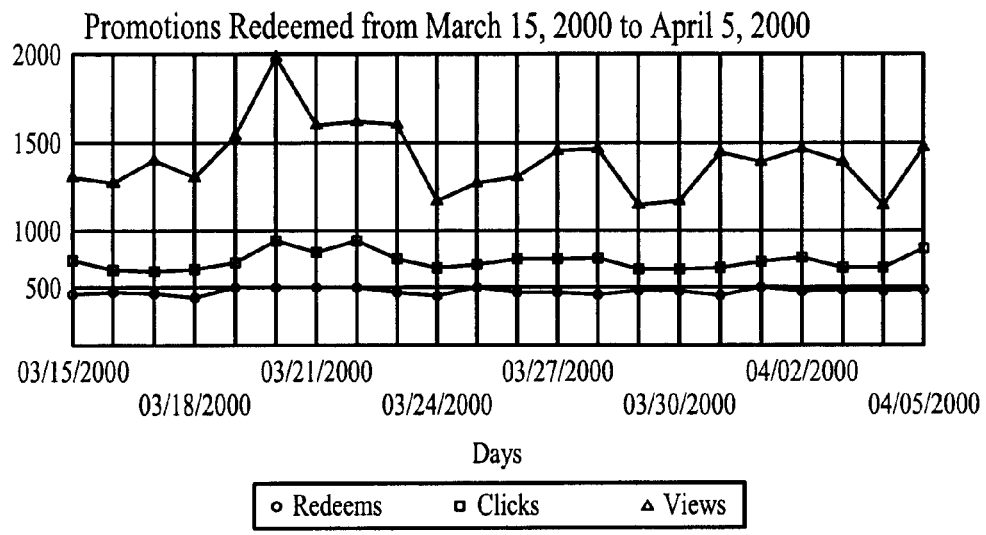

FIG. 5

Partner Resource Center
Home | Promotions | Reports
Manage | Authorize
Demo User - Demo Retailer
Log Off
284
Pull Promotion
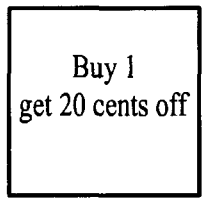
Buy 1 Demo Cola get US$0.20 off.
Offer: Buy 1, get US$ 0.20 discount.
Start Date: 3/15/00
End Date: 4/19/00
Qty. Issued 10000
Qty. Redeemed: 0
286
FIG. 6

Partner Resource Center

Home | Promotions | Reports
Manage | Authorize

290 Demo User - Demo Retailer
Log Off

Authorize

292

| Creation Date | Start Date | End Date | Promotion Status | View as | |
|---|---|---|---|---|---|
| All Dates ▽ | All Dates ▽ | All Dates ▽ | New ▽ | Text ▽ | Refresh |

Site: Demo Site   | Title ▽ |   | Contains ▽ |   |
296            294

| Promotion ID | Title | Site | Start | Stop | Actions |
|---|---|---|---|---|---|
| 5331 | Sign up for AOL and get $15 off | Demo Site | 02-01-2000 | 05-31-2000 | Accept, Decline |
| 6092 | Buy 3 Demo-Cola get 1 free. | Demo Site | 05-16-2000 | 06-21-2000 | Accept, ─300 Decline ─302 |
| 6099 | Buy 2 get 2 free | Demo Site | 05-04-2000 | 05-31-2000 | Accept, Decline |

Partner Resource Center
Home | Promotions | Reports
Manage | Authorize
Demo User - Demo Retailer
Log Off
Accept Promotion    304
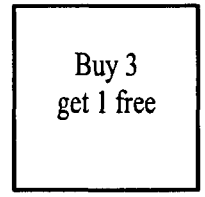
Buy 3 Demo-Cola get U1 free.
Start Date: 5/16/00
End Date: 6/21/00
Qty. Issued 5000
Rule label: [Buy 3 and get 1 free.]
| UPC | Brand | Description | Retailer SKU |
|---|---|---|---|
| Buy | | | |
| UPCDEMO1 | Demo Brand | Demo Product1 | |
| Get | | | |
| UPCDEMO1 | Demo Brand | Demo Product1 | |
306
[Accept]   [Cancel]
FIG. 8

Partner Resource Center

Home | Promotions | Reports
Manage | Authorize

Demo User - Demo Retailer
Log Off

Decline Promotion          308

Title: Buy 3 Demo-Cola get 1 free.
Offer: Buy 3 and get 1 free.
Start Date: 5/16/00
End Date: 6/21/00
Qty. Issued 5000

| UPC | Brand | Description | Retailer SKU |
|---|---|---|---|
| Buy | | | |
| UPCDEMO1 | Demo Brand | Demo Product1 | |
| Get | | | |
| UPCDEMO1 | Demo Brand | Demo Product1 | |

310

[ Decline ]    [ Cancel ]

FIG. 9

Partner Resource Center

Home | Promotions | Reports
Manage | Success
                    320

Accounting Report                    Demo User - Demo Retailer
                                                                                 Log Off
                                                                    312a
314
                                   Site: Demo Site    316
                                   Report Type
Date Range                         | Total Results Only  ▽ |      | Refresh |
⦿ | All Dates  ▽ |
    From:           To:
○ |          |   |          |

| ▦ ▽ |       | ▦ ▽ |

318a

Promotion                Date    Redeemed    Amount
  6091   Buy 1 Demo Cola get US$0.20 off.     10,074      $2,014.80

Total                                         10,074      $2,014.80

FIG. 10A

Partner Resource Center

Home | Promotions | Reports
Manage | Success 314   320

Accounting Report    Demo User - Demo Retailer
                         Log Off Date Range    Site: Demo Site    316
◉ [All Dates ▼]    Report Type
              [Results by Day ▼]    [Refresh]

From:    To:
○ [        ]   [        ]

[▦▼]    [▦▼]

318b

| Promotion | Date | Redeemed | Amount |
|---|---|---|---|
| 6091 Buy 1 Demo Cola get US$0.20 off. | | | |
| | Mar-15-2000 | 454 | $90.80 |
| | Mar-16-2000 | 454 | $90.80 |
| | Mar-17-2000 | 454 | $90.80 |
| | Mar-18-2000 | 408 | $81.60 |
| | Mar-19-2000 | 499 | $99.80 |
| | Mar-20-2000 | 499 | $99.80 |
| | Mar-21-2000 | 499 | $99.80 |
| | Mar-22-2000 | 499 | $99.80 |
| | Mar-23-2000 | 454 | $90.80 |
| | Mar-24-2000 | 408 | $81.60 |
| | Mar-25-2000 | 499 | $99.80 |
| | Mar-26-2000 | 454 | $90.80 |
| | Mar-27-2000 | 454 | $90.80 |
| | Mar-28-2000 | 408 | $81.60 |
| | Mar-29-2000 | 454 | $90.80 |
| | Mar-30-2000 | 454 | $90.80 |
| | Mar-31-2000 | 408 | $81.60 |
| | Apr-1-2000 | 499 | $99.80 |
| | Apr-2-200 | 454 | $90.80 |
| | Apr-3-2000 | 454 | $90.80 |
| | Apr-4-2000 | 454 | $90.80 |
| | April-5-2000 | 454 | $90.80 |
| *Total of: Buy 1 Demo Cola get US$0.20 off.* | | *10,074* | *$2,014.80* |
| Total | | 10,074 | $2,014.80 |

FIG. 10B

Partner Resource Center

Home | Promotions | Reports
Manage | Success

Success

Demo User - Demo Retailer
Log Off

BEGIN Date Range   END Date Range   Promotion Status:
⦿ [All Dates ▽]   ⦿ [All Dates ▽]   [Any Status ▽]                [Refresh]
From:              From:            Success Measure: — 328
○ [      ] ⊞      ○ [      ] ⊞     [Redeemed/Issued ▽]
To:                To:
  [      ] ⊞        [      ] ⊞     [Promotion ID ▽] [Contains ▽] [          ]

| ID | Title | Begin | End | Redeemed/Issued |
|---|---|---|---|---|
| 6192 | Get 1 Demo Product free. | 03-27-2000 | 05-31-2000 | 83.5% |
| 6094 | Buy 1 Demo Product get US$0.10 off. | 04-01-2000 | 05-31-2000 | 65.4% |
| 6091 | Buy 1 Demo Cola get US$0.20 off. | 03-15-2000 | 04-19-2000 | 42.6% |

FIG. 11

METHOD OF AND SYSTEM FOR MANAGING PROMOTIONS FOR PURCHASE TRANSACTIONS OVER A NETWORK

CROSS REFERENCE TO RELATED APPLICATIONS

This application is a continuation of application Ser. No. 09/595,677, filed Jun. 19, 2000 now U.S. Pat. No. 7,599,850, the contents of which are incorporated herein by reference.

FIELD OF THE INVENTION

This invention relates to a method of and system for managing promotions for purchase transactions over a network and more particularly to a method and system that enables a manufacturer or retailer to monitor the status of and track the redemption of promotions for items offered for sale at online retail outlets.

BACKGROUND OF THE INVENTION

In order to increase the number of new customers who buy a particular product, many retail outlets, and grocery stores in particular, set up a database of certain items that it sells and links each of these primary items to a secondary item that is different from the item to which it is linked for the purpose of promoting the secondary item. As a customer is checking out and each item is scanned at the checkout, the items are monitored and simultaneously compared to the items in the database to determine whether any of the items are associated with a secondary item. If an item is associated with a secondary item, a coupon for the secondary item is printed out for the customer to use at a later date.

This system enables the store to provide to a customer, who may not normally purchase the secondary item, an incentive for purchasing the secondary item, simply because the customer purchased the particular item that was linked to the secondary item. The system thus potentially creates a new customer for the secondary item.

While this system is in use in the so-called "brick and mortar" outlets, there is no such system that enables an online retail store to provide coupons to customers for items in this manner. Furthermore, in the above-described system, the promotions are available only within each store or store chain where the promotion has been set up. A promotion cannot be set up by a manufacturer or wholesaler for an item at a central location that is available to a large number of retail outlets for access to the promotions and for redemption of the coupons. There is also no means for managing the coupons online and for monitoring the success of the coupons.

Accordingly, it is an object of this invention to provide a method of and system for managing promotions for items offered for sale at online retail outlets, wherein a manufacturer or retailer has access to its promotions to authorize the promotions, obtain an accounting for the promotions and to obtain a report of the success of the promotions.

This invention relates to a method of and system for distributing and redeeming electronic coupons or "tokens" in a computer network environment and more specifically to a method and system for distributing, in advance of a request for information for which the "token" has relevance which may be redeemed.

With the rapid growth of computer networking and requests for information from one computer to the next e.g. the Internet, it has become common practice for a provider of information (a "Server") to provide each specific requester of information (a "Client"), with an electronic "token" (commonly referred to as a "Cookie") for the purpose of "recognizing" the client and/or providing some pre-determined and pre-programmed level of customization at the discretion of the information provider.

Thus, in the prior art, the first time a client makes an electronic request for information from the server, the server delivers the requested information and, in addition, an electronic "token" or Cookie that allows the "server" to recognize the "client" and is able to customize the information provided in subsequent requests. The Cookie can also be used to identify a specific client or set of clients to control access to specific information or entry points of the server's private network.

In ordinary commerce, information providers such as newspapers and magazines are used to attract or identify specific market segments of consumers in order to permit vendors to target consumers in those specific market segments with advertising. This frequently includes the use of coupons which may be redeemed by consumers for discounts on product purchases and for other benefits. Typically, the source of the coupon is either the vendor's own product or publication or that of a distributor or other information provider associated with the vendor. One of the benefits of coupons is that they provide the vendor with some measure of the effectiveness of their advertising by using coupons that are unique to each source of advertising. However, the tracking of paper coupons is a very time consuming and imprecise process.

With the advance of the Internet, consumers can download and print out coupons from many online sources. Consumers can take these coupons to their local store to redeem them or return them to their source along with a proof of purchase in order to receive a refund by mail. These methods are both inconvenient and time consuming for the consumer. Currently, there is no effective way to distribute and redeem coupons online.

Accordingly, it is an object of this invention to provide an improved method and system for distributing and redeeming coupons in a network environment.

SUMMARY OF THE INVENTION

The invention is directed to a method of and system for managing promotions for items offered for sale at online retail outlets. The method and system enable a manufacturer or retailer to access statistics of its promotions, including the number of promotions issued and redeemed. The method and system also enable the manufacturer or retailer to authorize or decline a promotion that has been created and to obtain accounting reports that provide information about the dollar value of the promotions that have been redeemed.

A system for managing promotions over a network according to one embodiment of the invention includes a promotion server system having a computer processor and associated datastore, the datastore containing data representative of terms and statistics of one or more item promotions and a commercial server system including a computer processor, the commercial server system being selectively coupleable to the promotion server system over the network. The promotion server system includes promotion code for transferring, to the commercial server system, the data representative of the terms and statistics of the promotions. The promotion server system may further include authorization code for enabling the commercial server system to accept or decline one or more of the promotions and/or accounting code for providing to the commercial server system data representative of one or more of the number of promotions redeemed and the value of the redeemed promotions. Certain of the promotion data in the datastore of said promotion server system may be associated with a specific commercial server system and the specific commercial server system can only access the certain of the promotion data associated therewith. The authorization code may include screen display data having a promotion search portion for enabling the commercial server system to search for its promotions based on search terms input to the promotion search portion by the commercial server system. The promotion code may include screen display data having a promotion search portion for enabling the commercial server system to search for its promotions based on search terms input to the promotion search portion by the commercial server system. The accounting code may include screen display data having a promotion search portion for enabling the commercial server system to search for its promotions based on search terms input to the promotion search portion by the commercial server system. The accounting code screen display data may include a table having at least one of the total number of promotions redeemed and the total value of the redeemed promotions. The accounting code screen display data table may include at least one of the total number of promotions redeemed and the total value of the redeemed promotions for each of a number of days that the promotions are active. The promotion data may be transferred to the commercial server system in the form of screen display data.

According to another embodiment of the invention, a method of managing promotions over a network includes the steps of establishing a connection between a commercial server system and a promotion server system over the network and the promotion server system transferring promotion data to the commercial server system over the network, the promotion data including terms of the promotions and statistics of a performance of the promotions. The promotion data may be transferred to the commercial server system in the form of screen display data. The method may further include the step of the commercial server system selecting a promotion management option, wherein the promotion server system transfers screen display data to the commercial server system that provides the commercial server system with an option to view the statistics and the step of the commercial server system selecting a promotion management option, wherein the promotion server system transfers screen display data to the commercial server system that provides the commercial server system with an option of pulling one or more of the promotions from an active status. The method may further include the step of the commercial server system selecting a promotion authorization option, wherein the promotion server system transfers screen display data to the commercial server system that provides the commercial server system with an option of accepting a promotion and the step of the commercial server system selecting a promotion authorization option, wherein the promotion server system transfers screen display data to the commercial server system that provides the commercial server system with an option of declining a promotion. The method may further include the step of the commercial server system selecting a promotion accounting report option, wherein the promotion server system transfers screen display data to the commercial server system that provides the commercial server system with statistics that include the dollar value of the promotions redeemed by a client system through the commercial server system and the step of the commercial server system selecting a promotion success report option, wherein the promotion server system transfers screen display data to the commercial server system that provides the commercial server system with statistics that include a redemption rate of the promotions redeemed by a client system through the commercial server system.

According to another embodiment of the invention, a system for managing promotions over a network includes a promotion server system and associated data store containing data representative of one or more item promotions, a commercial server system selectively coupleable to the promotion server system over the network and at least one client system selectively coupleable to the commercial server system over the network. The promotion server system includes available promotion code for providing, to the commercial server system, data representative of the identity and terms of one or more of the item promotions and promotion distribution code, responsive to requests from the commercial server system for specific ones of the item promotions, for transmitting the promotion data for the specific item promotions to the commercial server system. The commercial server system is responsive to access thereto by one of the client systems, and includes pointer code that points the client system to the promotion data representative of terms of the promotions in the datastore, to transfer the promotion term data to the client system. The item promotion data in the data store may be associated with a specific commercial server system and the available promotion code may transmit to the specific commercial server system only item promotion data associated with the specific commercial server system. The promotion server system may maintain data representative of the identity of the commercial server system and the identity of item promotion data requested by the commercial server system. The commercial server system and the client systems may include code which enables transactions over the network and the commercial server system may include code for transmitting, to the promotion server system, transaction data representative of transactions between the commercial server system and the client systems which involve the item promotions. The promotion server system may maintain data representative of the transaction data. The promotion server system and the commercial server system may include code enabling the commercial server system to request information relating to the transaction data and, in response thereto, to adjust the terms of the promotions.

The invention is directed to a method of and system for distributing and redeeming electronic coupons in a networked environment where the source of the coupons, the consumer and vendor are all connected to a common communications channel. The consumer, via a client system, can connect to a source of the coupons, typically a server, which will transfer an electronic coupon or a "book" of electronic coupons to the client. These coupons are transferred in advance of the client establishing a connection with the vendor's server in order to request information or obtain discounts on purchases of the vendors products or services. When the client does establish a connection with a vendor's server and initiates a transaction for information, goods or services, the vendor's server can recognize that the client bears a coupon which can modify the transaction and permit the client to redeem the coupon. The coupon can include an encrypted or encoded portion which would permit the server to communicate with another server such as an authentication server to authenticate and/or validate the coupon.

The system according to the invention includes a first server system, including a computer processor and associated memory and a client system, including a computer processor and associated memory, coupled to a communications channel. The client system is adapted to request information from the first server system and the first server system is adapted for transferring information over the communications channel. The first server system is also adapted for transferring an electronic coupon to client system and the client system is adapted for storing the electronic coupon in the associated memory. The system can further include a second server system, including a computer processor and associated memory, coupled to the communications channel. The client can be adapted to initiate a transaction with the second server system. The second server system can be adapted to detect the electronic coupon in order to enable or modify the nature or value of the transaction. The system can further include a third server system, including a computer processor and associated memory, which can be coupled to the communications channel. The second server system can establish a connection with the third server system in order to enable the third server system to authenticate the electronic coupon and authorize the completion of the transaction contemplated.

In another embodiment, the first server system may be adapted for transferring an electronic token to the client system and the client system may be adapted for storing the electronic token in the associated memory. In this embodiment, all of the data relating to the coupon resides on a separate server system, and the electronic token includes pointer information pointing to the coupon data on the separate server system.

In another embodiment, the first server system may include script necessary to form a first website frame having a predetermined signature. The first server system provides an electronic token to the client system such that the electronic token uniquely corresponds to the predetermined signature. In this embodiment, the second server system also includes script necessary to form a second website frame having the same predetermined signature as the first website frame, such that the second server system may retrieve the electronic token deposited by the website frame. The electronic token may include the complete body of coupon information, or the electronic token may only include data identifying the client and pointing to coupon information associated with the client and residing on a separate server system.

The method according to the invention includes the steps of a client system requesting information from a first server system. The first server system transfers the requested information and includes an electronic coupon along with the information transferred. The client system stores the electronic coupon in memory. The client system subsequently requests information from a subsequent server system. The subsequent server system can detect that the client system holds the electronic coupon and upon initiation of a transaction with the subsequent server system, the subsequent server system can enable or modify the transaction, such as by providing a discount in the purchase price of goods or services or provide access or a modified level of access to the information requested as a function of the electronic coupon.

BRIEF DESCRIPTION OF THE DRAWINGS

The foregoing and other objects of this invention, the various features thereof, as well as the invention itself may be more fully understood from the following description when read together with the accompanying drawings in which:

FIGS. 3-11 are diagrams of the screen displays for each of the steps involved in the method in accordance with the present invention;

DETAILED DESCRIPTION OF THE PREFERRED EMBODIMENTS

The present invention is directed to a method of and system for managing promotions for items offered for sale on a communication network such as the internet. A promotion server system includes screen display code that enables a commercial server system to select from a number of options for reviewing the performance of the promotions set up on the promotion server system by the manufacturer or retailer. One of the options includes a screen display that enables the commercial server system to review a listing of all of its promotions and the status of each promotion. Another option includes a screen display that enables the commercial server system to review a listing of its promotions and to accept or authorize each promotion or to decline or cancel each promotion. Another option includes a screen display that provides reports about each promotion, including an accounting report and a success report. An overview option includes a programmable screen display that provides a ranking of the performance of each of a manufacturer's or retailer's promotions relative to each other. In order for the promotion server system to obtain the information necessary to compile the accounting and success reports, as well as the overview page, the commercial server system reports this information to the promotion server system. The commercial server system can either report this information to the promotion server system, or the commercial server system can use the promotion server system to process the redemption of the promotions, as described in commonly assigned U.S. Pat. No. 6,041,309, entitled METHOD OF AND SYSTEM FOR DISTRIBUTING AND REDEEMING ELECTRONIC COUPONS and commonly assigned patent application Ser. No. 09/573,706, now abandoned, entitled METHOD OF AND SYSTEM FOR DISTRIBUTING AND REDEEMING ELECTRONIC COUPONS, both incorporated herein by reference. By using the promotion server system for processing the redemption of the promotions, the promotion server system has the information necessary for compiling the reports.

Figure 1:
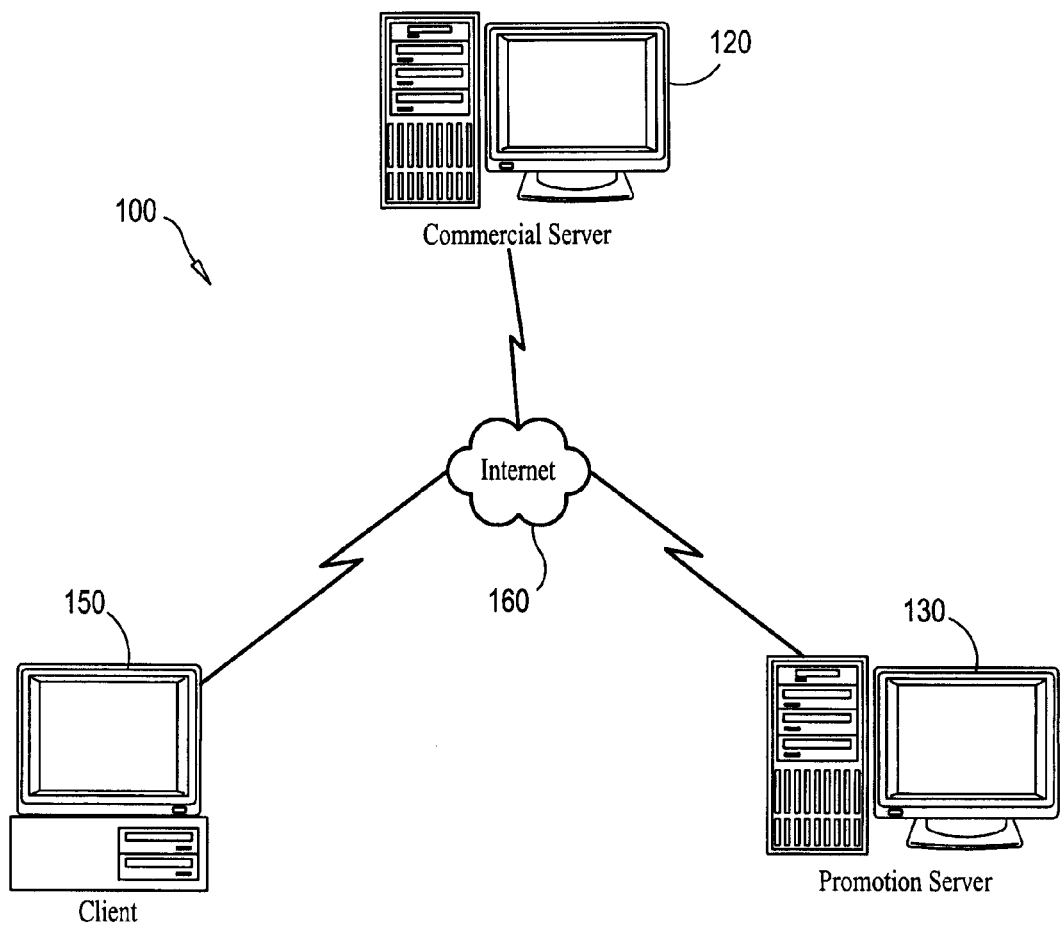
FIG. 1 is a diagrammatic view of a system for defining promotions in accordance with the present invention.

FIG. 1 shows a diagram of a system 100 for managing promotions in accordance with a preferred embodiment of the present invention. The system 100 includes commercial server system 120 and promotion server system 130 connected to a common communications network 160. A client system 150 may also be connected to the communications network 160. Preferably, the commercial server system 120, promotion server system 130 and client system 150 can each be a personal computer such as an IBM PC or IBM PC compatible system or an APPLE® MacINTOSH® system or a more advanced computer system such as an Alpha-based computer system available from Compaq Computer Corporation or a SPARC® Station computer system available from SUN Microsystems Corporation, although a main frame computer system can also be used. Preferably, the communications network 160 is a TCP/IP-based network such as the Internet or an intranet, although almost any well known LAN, WAN or VPN technology can be used.

In one preferred embodiment of the invention, the client system 150 is an IBM PC compatible system operating an operating system such as the Microsoft Windows® operating system, and commercial server system 120 and promotional server system 130 are configured as web servers providing access to information such as web pages in HTML format via a protocol such as the HyperText Transport Protocol (http). The client system 150 includes software to allow viewing of web pages, commonly referred to as a web browser, thus being capable of accessing web pages located on commercial server system 120 and promotional server system 130. Alternatively, client system 150 can be any wired or wireless device that can be connected to a communications network, such as an interactive television system, such as WEBTV, a personal digital assistant (PDA) or a cellular telephone. In this preferred embodiment, commercial server system 120 can be either an e-tail server offering a plurality of items for sale over the Internet, a distributor or a manufacturer or items and promotion server system 130 includes a database for storing the promotions that define electronic coupons and promotional linking code for linking items in the inventory to promotional terms that define the electronic coupons. Promotional server system 130 also includes the software necessary to authenticate electronic coupons prior to their redemption. The commercial server system 120 is responsive to access thereto by the client system 150, and includes pointer code that points the client system to promotion data representative of terms of the promotions in the database of the promotion server system 130, to transfer promotion term data to the client system. The items offered for sale by the e-tail server 120 can be products and/or services.

In one preferred embodiment, promotion server system 130 includes web server software that is adapted to produce an electronic coupon or a book of electronic coupons that is transferred to the client system 150 in the form of an electronic token, such as a cookie, that is stored in memory at the client system. Preferably, the electronic coupon is a data structure which can include any or all of the following information elements: data representative of an electronic coupon serial number or identification number; data representative of a unique key that can be used to validate or authenticate the coupon; data representative of the vendor that authorized the coupon and will redeem the coupon; and data representative of the nature of the discount or access provided by the coupon data representative of the server or entity that issued the coupon. In one preferred embodiment, the electronic coupon can be issued as part of an electronic coupon book. The coupon book can include data representative of a version number for the electronic coupon book and data representative of a serial number or identification number for the electronic coupon book.

In one preferred embodiment, the electronic coupon contains all the information necessary to redeem the coupon. Specifically, the electronic coupon identifies the grantor (i.e., the party or vendor that will redeem the electronic coupon), the nature of the discount or benefit provided and a unique serial number or other data structure that permits the electronic coupon to be authenticated or validated. Thus, a server redeeming this type of electronic coupon can obtain all the information necessary to redeem from the electronic coupon. The server can even include the software necessary to authenticate or validate the electronic coupon.

In an alternative embodiment, an electronic coupon book includes a unique serial number or identification number and data structure useful for authenticating or validating the electronic coupon book. The actual content of the electronic coupon book can be determined for example, by visiting a website which reads the coupon book serial number and provides the user with listings of the coupons available. A benefit to this configuration is the organization that issues the electronic coupon book can add vendors even after the electronic coupon book has been issued. Thus, if a vendor signs up with the organization that issues electronic coupon books after a particular coupon book has been issued to a client, the vendor can be added to the electronic coupon book at a later date. In order to redeem this type of electronic coupon, the server that intends to redeem the electronic coupon must connect to an authentication server which will authenticate or validate the coupon book and indicate the nature of the benefit of the electronic coupon to the server requesting authentication/validation. Another benefit of this configuration is that the coupons are relatively tamper-proof due to the authentication and validation facilities. In many prior art systems, coupons could be copied and/or altered by the user with relative ease; in the absence of validation/authentication schemes, few reliable methods for detection of such counterfeits exist.

Figure 2:
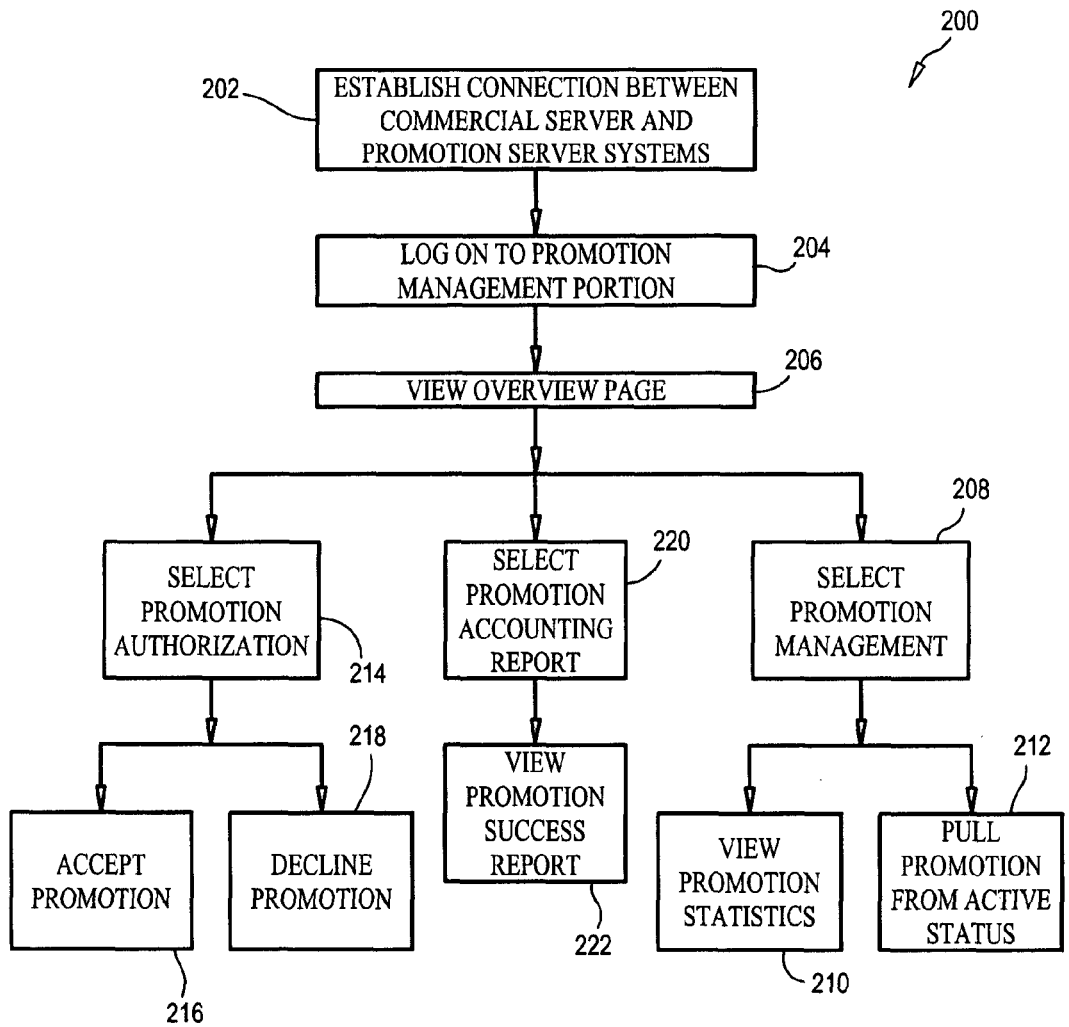
FIG. 2 is a flow diagram of a method of defining promotions in accordance with the present invention.

FIG. 2 shows a flow diagram 200 of a method of managing promotions in accordance with one preferred embodiment of the invention. In a primary step 202, the commercial server system 120, FIG. 1, establishes a connection with the promotion server system 130 over communications network 160. The commercial server system then initiates promotion management by logging on to the website hosted by the promotion server system, step 204. By logging on to the website with a username and password that is specific to that commercial server system, the user of the commercial server system gains access to its account which includes the promotions that have previously been created by the commercial server system. When logged on, the promotion server system generates screen display data that shows a promotion overview page, step 206. The promotion overview page is customizable by the commercial server system and can provide a ranking of the commercial server system's promotions, relative to each other.

In the preferred embodiment, from the promotion overview page, the user of the commercial server system has three options. First, the promotion management option may be selected, step 208. When this option is selected, the promotion server system generates screen display data that shows a listing of the commercial server system's active promotions. From this screen, the user of the commercial server system can choose to view the statistics of each promotion, step 210, or to pull the promotion from active status, step 212.

Second, the promotion authorization option may be selected, step 214. When this option is selected, the promotion server system generates screen display data that shows a listing of the commercial server system's promotions that have been defined by the commercial server system. Preferably, the promotions are created using the invention described in applicant's commonly assigned patent application Ser. No. 09/596,664, now abandoned, entitled METHOD OF AND SYSTEM FOR DEFINING A PROMOTION FOR A PURCHASE TRANSACTION OVER A NETWORK, incorporated herein by reference. For each promotion, the listing includes a promotion identification number, the title of the promotion, the website hosted by the commercial server system and the commencement and expiration dates of the promotion. The user of the commercial server system can then accept or authorize the promotion, step 216, or decline the promotion, step 218.

When the promotion accounting report option is selected, step 220, the promotion server system generates screen display data that shows the number of electronic coupons redeemed for each promotion and the total dollar amount of the promotion. From the accounting report, the user may view a promotion success report, step 222. When the promotion success report is selected, the promotion server system generates screen display data that shows how successful each promotion has been, as dictated by the total number of electronic coupons redeemed or by a ratio of the number of electronic coupons redeemed to the total number of electronic coupons issued.

Figure 3:
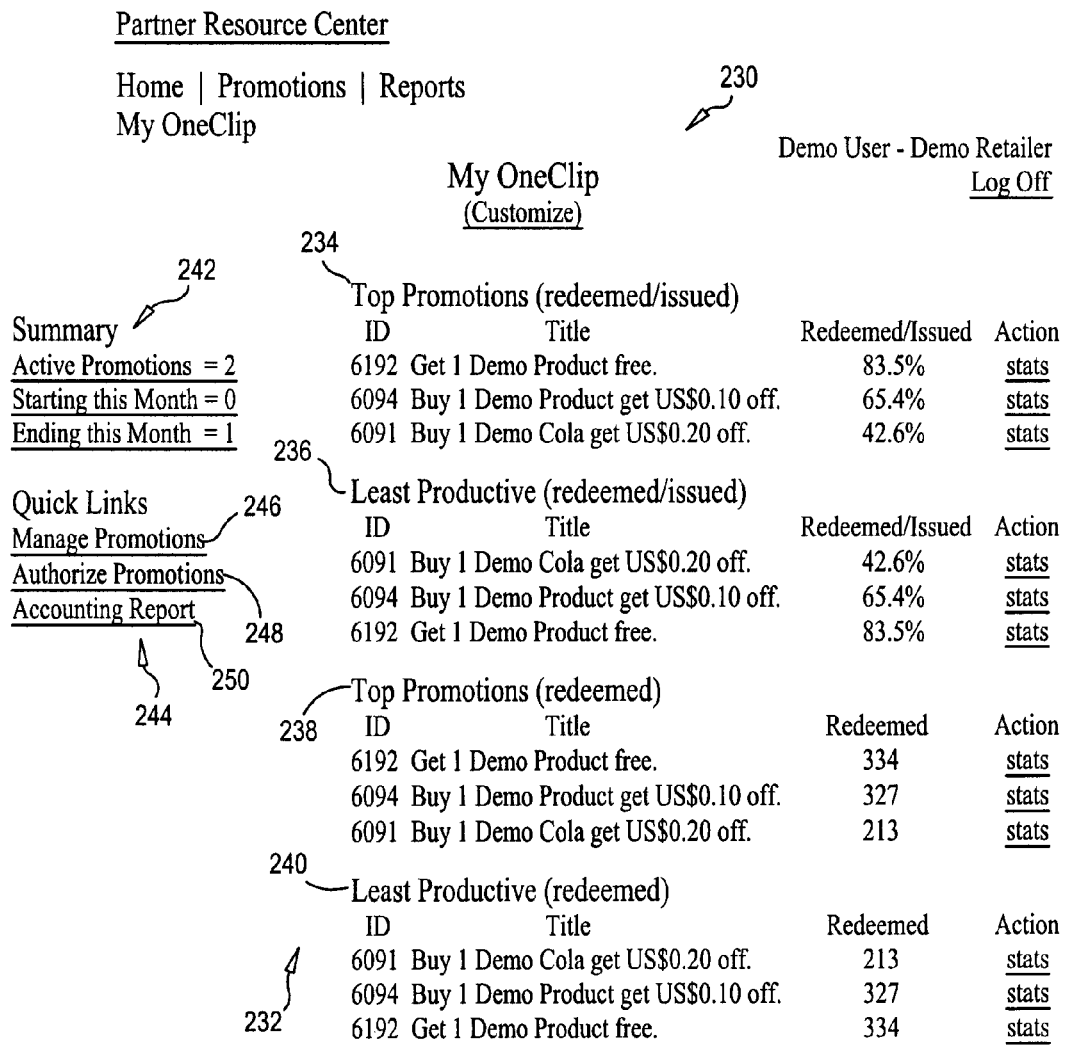

An example of the management of promotions will now be described with reference to FIGS. 3-11, which are screen displays generated by the promotion server system. FIG. 3 shows the promotion overview page 230 that is accessed in step 206, FIG. 2. When the user logs on to the promotion server using its specific username and password, the user is allowed to access only its own account which includes its promotions. Promotion overview page 230 includes promotion ranking portion 232 which includes several categories in which the promotions are ranked. Each of the promotions are identified by a promotion identification number and a title. The promotions may be ranked in a top promotion category 234 and a least productive category 236, wherein the promotions are ranked based on the redemption ratio of the promotions; and a top promotion category 238 and a least productive category 240, wherein the promotions are ranked based on the number of redeemed promotions. Promotion ranking portion 232 may be customized by the user to include any number of these categories and also may include graphs of the promotion redemptions. Promotion overview page 230 also includes a summary portion 242 which shows the total number of active promotions, the number of promotions starting in the current month and the number of promotions ending in the current month. Links portion 244 includes links to the management, authorization and report options of the invention.

When the user "clicks on" the "Manage Promotions" link 246, step 208, the promotion server system generates the promotion management screen display 252, FIG. 4. Promotion management screen display 252 includes a promotion search portion 254 which enables the user to search for its promotions based on the creation date, box 256, which allows the user to search all dates, specific dates, or ranges of dates. The user can also search based on the status of the promotion, box 258, whether the promotion is active, inactive, in production or disabled. The format of the promotions is selected in box 260, which allows the user to select to view only the text of the promotion or the graphics of the electronic coupon associated with the promotion. The title or promotion identification number of the promotion may also be searched using key word search portion 262. As shown in FIG. 4, three promotions have been found as a result of a search for all of the promotions of the commercial server system "Demo Site," as indicated by website identifier portion 264. Promotion table 266 includes each of the promotions found in the search. Each of the promotions listed in table 266 are identified by the promotion identification number and title of the promotion, as well as the start and expiration dates and status of the promotion. Under the "Action" heading, the user has the option of either viewing the statistics of the promotion or pulling the promotion from active status.

By clicking on the "Stats" link 268 for a particular promotion, the user gains access to promotion statistics page 272, FIG. 5, to view the statistics for the promotion, step 210. Promotion statistics page 272 includes information about the number of promotions issued, viewed, "clicked," and redeemed, as well as the total money spent to take advantage of the promotion and the amount of money saved by the consumers of the promotional product as a result of redeeming the electronic coupon associated with the promotion. Promotion statistics page 272 also includes a graph portion 274 that shows a graphical representation of the promotion statistics. The user can select the promotion for which a graph is generated in box 276, as well as the date range of the graph in box 278. The type of graph is selected in portion 280 and the data included in the graph is selected in portion 282.

By clicking on the "Pull" link 270, FIG. 4, for a particular promotion, the user gains access to promotion page 284, FIG. 6. Promotion page 284 includes information that identifies the particular promotion, and a "Pull" button 286 which, when clicked, removes the promotion from active status, step 212, FIG. 2.

By clicking on the "Authorize Promotions" link 248, FIG. 3, the promotion authorization option is selected, step 214, FIG. 2. The promotion server system then generates the promotion authorization screen display 290, FIG. 7. Promotion authorization screen display 290 includes a promotion search portion 292, similar to the promotion search portion 254 of the management screen display 252, which enables the user to search for its newly created promotions which have not yet been authorized. The promotion search may be based on the creation date, start date and expiration date of the promotion. The user can also search based on the status of the promotion. The title or promotion identification number of the promotion may also be searched using key word search portion 294. As shown in FIG. 7, three promotions have been found as a result of a search for all of the promotions of the commercial server system "Demo Site," as indicated by website identifier portion 296. Promotion table 298 includes each of the promotions found in the search. Each of the promotions listed in table 298 are identified by the promotion identification number and title of the promotion, as well as the start and expiration dates and status of the promotion. Under the "Action" heading, the user has the option of either accepting or authorizing the promotion or declining the promotion.

By clicking on the "Accept" link 300, the user gains access to accept promotion page 304, FIG. 8. Accept promotion page 304 includes information that identifies the particular promotion, and an "Accept" button 306 which, when clicked, accepts the promotion into active status, step 216, FIG. 2. By clicking on the "Decline" link 302, FIG. 7, the user gains access to decline promotion page 308, FIG. 9. Decline promotion page 308 also includes information that identifies the particular promotion, and a "Decline" button 310 which, when clicked, declines the promotion from active status, step 218, FIG. 2.

By clicking on the "Accounting Report" link 250, FIG. 3, the promotion accounting report option is selected, step 220, FIG. 2. The promotion server system then generates the promotion accounting report screen display 312, FIG. 10A. Promotion accounting report screen display 312 includes date range input portion 314 for selecting the date range of the desired accounting data for a particular promotion and report type selection box 316 for selecting the format of the accounting report. In FIG. 10A, the "Total Results Only" format is selected, resulting in a data display portion 318*a* that shows the total number of promotions redeemed and the total value of the redeemed promotions. Alternatively, the selection of the "Results by Day" format in report type selection box 316 results in a data display portion 318*b*, FIG. 10B, that shows the number of promotions redeemed and the total value of the redeemed promotions for each day that the promotion is active or for each day selected in date range input portion 314.

From promotion accounting report screen display 312, by clicking on the "Success" link 320, FIGS. 10A and 10B, the promotion success report option is selected, step 222, FIG. 2. When this option is selected, the promotion server system generates the promotion success screen display 322, FIG. 11. Promotion success screen display 322 includes a promotion search portion 324, similar to the promotion search portion 254 of the management screen display 252, which enables the user to search for its promotions. The promotion search may be based on a start date range and expiration date range of the promotion. The user can also search based on the status of the promotion. The title or promotion identification number of the promotion may also be searched using key word search portion 326 and the format of the success report is selected in success measure selection box 328. As shown in FIG. 11, the "Redeemed/Issued" success measure is selected in box 328, resulting in a data portion 330 that lists each promotion found in the search and the success of each promotion as a ratio of the number promotions redeemed to the total number of promotions issued. Alternatively, data portion 330 could include only the total number of promotions redeemed.

Accordingly, the present invention enables a commercial server system to manage its promotions by providing a system that allows the commercial server system to accept or decline pending promotions, to view redemption and accounting statistics of the promotions and, based on these statistics, to pull promotions from active status. This allows the commercial server system to monitor its promotions and to change the promotions in real time based on the performance of the promotions.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The present invention is directed to a method of and system for distributing and redeeming electronic coupons. An electronic coupon is essentially a token, issued by or under the authority of the issuer for the benefit of recipient. Typically, the recipient receives the electronic coupon and subsequently redeems it for the prescribed benefit at some later point in time. Preferably, the electronic coupon enables or modifies an anticipated transaction such as providing a discount in the price of goods or services provided by the issuer or the issuer's agent. In addition, the electronic coupon can enable or modify the level of access to privately held information or a server having restricted access. Alternatively, the electronic coupon can be used in transactions between two businesses, two government agencies or two governments wherein, for example, the businesses enter into an agreement relating to a transaction for goods or services or access to information, or the governmental bodies enter into an agreement relating to transactions regarding currency or information. Although the distribution of electronic coupons may be selectively tailored to particular users based upon the users' demographics, shopping and spending habits, etc., a preferred embodiment of the invention distributes coupons to users independent of any known characteristics of the recipient.

Figure 101:
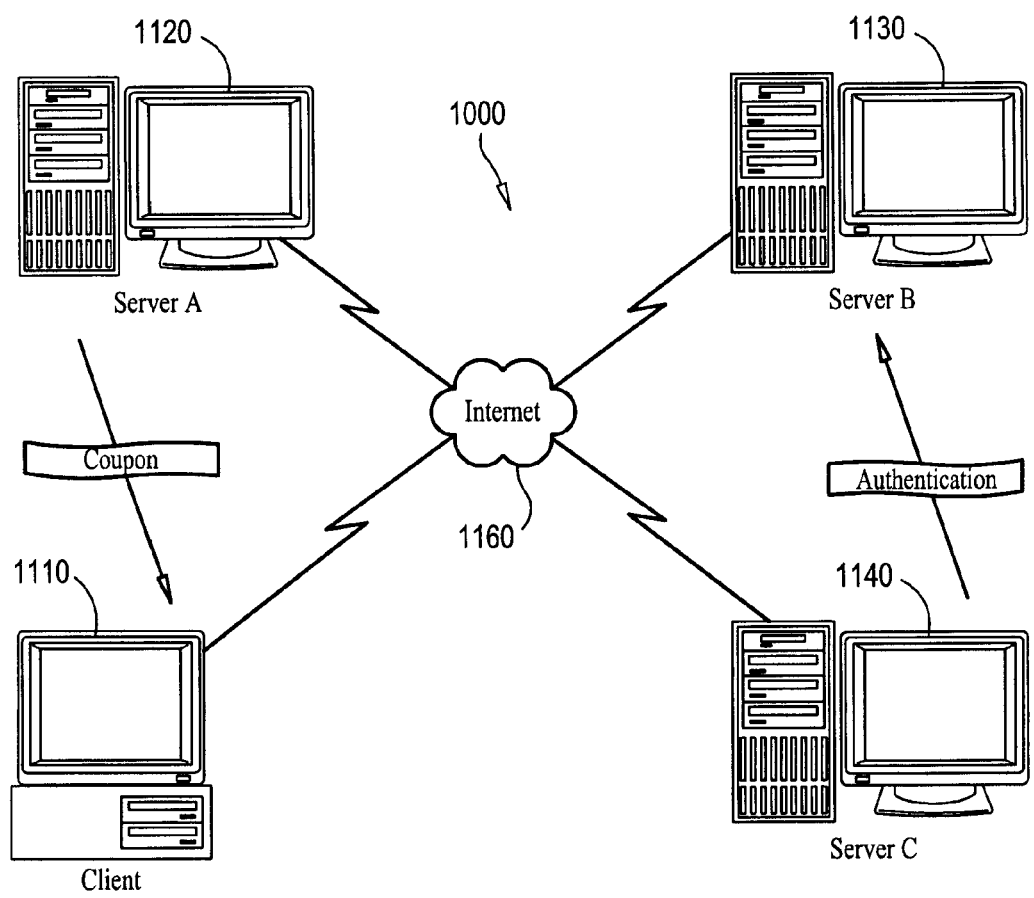
FIG. 101 is a diagrammatic view of a system for distributing and redeeming electronic coupons in accordance with the present invention.

FIG. 101 shows a diagram of a system 1000 for distributing and redeeming electronic coupons in accordance with a preferred embodiment of the present invention. The system 1000 includes Client system 1110, Server System A 1120, Server System B 1130, and Server System C 1140, all connected to a common communications channel 1160. Preferably, the Client system 1110, Server System A 1120, Server System B 1130, and Server System C 1140 can be a personal computer such as an IBM PC or IBM PC compatible system or an APPLE MacINTOSH system or a more advanced computer system such as an Alpha based computer system available from the Digital Equipment Corporation division of Compaq Computer Corporation or SPARC Station computer system available from SUN Microsystems Corp, although a main frame computer system can also be used. Preferably, the communications channel 1160 is a TCP/IP based network such as the Internet or an intranet, although almost any well known LAN, WAN, VPN technology can be used.

In one preferred embodiment of the invention, the Client system 1110 is an IBM PC compatible operating the Microsoft Windows 95 or 98 operating system and Server System A 1120, Server System B 1130, and Server System C 1140 are configured as Web Servers providing access to information such as web pages in HTML format via the HyperText Transport Protocol (http). Server System A 1120 is also configured to generate cookies and to transfer the cookies to the Client System 1110. The Client system 1110 includes software to allow viewing of web pages, commonly referred to as a Web Browser, such as Communicator available from Netscape Communications Corp. or Internet Explorer available from Microsoft Corp. The Client system 1110 is capable of accessing web pages located on Server System A 1120 and Server System B 1130. Server System C 1140 is an authentication server which includes the software necessary to authenticate electronic coupons prior to their redemption.

In one preferred embodiment, Service System A 1120 includes web server software that is adapted to produce an electronic coupon or a book of electronic coupons that is transferred to the Client system 1110 in the form of a Cookie that is stored in memory at the Client system. Preferable, the electronic coupon is a data structure which can include any or all of the following information elements: data representative of an electronic coupon serial number or identification number, data representative of a unique key that can be used to validate or authenticate the coupon, data representative of the vendor that authorized the coupon and will redeem the coupon, data representative of the nature of the discount or access provided by the coupon, data representative of the server or entity that issued the coupon. In one preferred embodiment, the electronic coupon can be issued as part of an electronic coupon book. The coupon book can include data representative of a version number for the electronic coupon book and data representative of a serial number or identification number for the electronic coupon book.

In one preferred embodiment, the electronic coupon contains all the information necessary to redeem the coupon. Specifically, the electronic coupon identifies the grantor (i.e. the party or vendor that will redeem the electronic coupon), the nature of the discount or benefit provided and a unique serial number or other data structure that permits the electronic coupon to be authenticated or validated. Thus, a server redeeming this type of electronic coupon can obtain all the information necessary to redeem from the electronic coupon. The server can even include the software necessary to authenticate or validate the electronic coupon.

In an alternative embodiment, the electronic coupon book includes a unique serial number or identification number and a data structure useful for authenticating or validating the electronic coupon book. The actual content of the electronic coupon book can be determined, for example, by visiting a website which reads the coupon book serial number and provides the user with listing of the coupons available. A benefit to this configuration is the organization that issues the electronic coupon book can add vendors even after the electronic coupon book has been issued. Thus, if a vendor signs up with the organization that issues electronic coupon books after a particular coupon book has been issued to a client, the vendor can be added to the electronic coupon book at a later date. In order to redeem this type of electronic coupon, the server that intends to redeem the electronic coupon must connect to an authentication server which will authenticate or validate the coupon book and indicate the nature of the benefit of the electronic coupon to the server requesting authentication/validation. Another benefit of this configuration is that the coupons are relatively tamper proof, due to the authentication and validation facilities. In many prior art systems, coupons could be copied and/or altered by the user with relative ease; in the absence of validation/authentication schemes, few reliable methods for detection of such counterfeits exist.

In another embodiment, all of the information embodied in the coupon (i.e. nature of benefit, authentication data, grantor data, valid vendors, etc.) may reside on a separate "clearing house" server, such that the Cookie held by the Client system 1110 merely conveys identifying information relating to the Client that points to the coupon on the clearing house server. In this embodiment, a Client "receiving" a coupon results in a modification of the clearing house server database rather than a modification of data on the Client system; i.e., the Client system never physically receives the coupon. This embodiment requires communication between the server issuing the coupon and the clearinghouse server, via internet, conventional telephone line or other suitable communications channel Likewise, when the coupon is to be redeemed by the Client system 1110, the redeeming server must establish a link to the clearinghouse server for identification, validation and authentication. In an alternate embodiment, the coupon or coupons residing on the clearinghouse server may be provided to a printing device peripheral to the clearinghouse server, such that hard-copy versions of the coupons may be mailed, sent via facsimile, or otherwise delivered to the Client system 1110.

Figure 102:
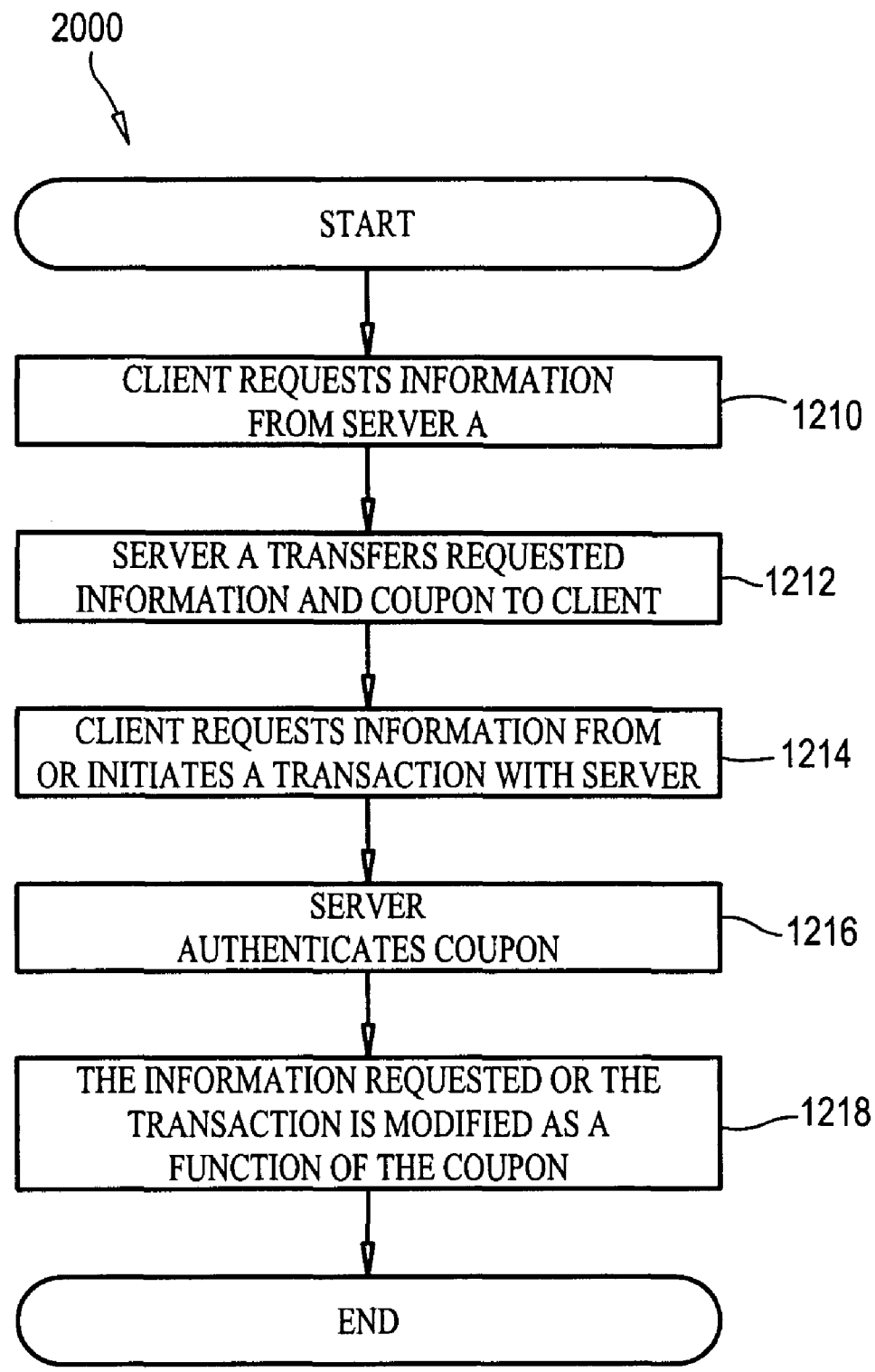
FIG. 102 is a flow diagram of a method of distributing and redeeming electronic coupons in accordance with the present invention.

FIG. 102 shows a flow chart 2000 of a method of distributing and redeeming coupons in accordance with one preferred embodiment of the invention. In a preliminary step 1210, the client system requests information from Server A. In the next step 1212, Server A transfers the requested information along with the electronic coupon to the Client system. The Client system stores the electronic coupon in memory. In the next step 1214, the Client system initiates a transaction or requests information from a Server. The Server could be Server A or another server. At this point, depending upon the system, the Server could detect the presence of the electronic coupon on the Client system or the Client system could present the electronic coupon for redemption. In the next step 1216, the Server authenticates the electronic coupon. Depending upon the system, the Server could evaluate the electronic coupon to authenticate or validate the electronic coupon, or alternatively, the Server could transfer the electronic coupon information to an Authentication Server which could authenticate or validate the electronic coupon and authorize the transaction. In the next step 1218, the electronic coupon is used to modify or enable the transaction and the transaction is completed.

As one of ordinary skill will appreciate, it will not always be necessary for the Client system to request information from Server A. All that is necessary is for Server A to establish a connection with the Client system in order to transfer the electronic coupon to the Client system. One method of transferring the electronic coupon is to include the electronic coupon with the information requested. Alternatively, the electronic coupon can be transferred to the Client system by any method of transferring information.

In a preferred embodiment of the invention, the Client system is a personal computer running browser software which connects to web servers via the Internet or a similar network. Preferably, a book of electronic coupons is transferred to the Client system in the form of a Cookie which is stored in memory at the Client system. The Cookie can be detected by any subsequent web server that Client system connects to. If the Client system attempts to initiate a transaction with a particular web server, the web server detects the Cookie which includes electronic coupon and uses the electronic coupon to enable or modify the transaction. In this embodiment, when the Client system receives the electronic coupon, the user can be alerted to the presence of the electronic coupon by another browser window or a java based window that identifies all the electronic coupons in the electronic coupon book, the nature of the benefit provided and provides links to the various web sites where the electronic coupons can be redeemed. Alternatively, the Client system can connect to a web server which displays the contents of the electronic coupon book in the form of a web page which describes the nature of the electronic coupon benefit and a link to the web page where the electronic coupon can be redeemed. In yet another embodiment of the invention, when the Client system receives the electronic coupon or coupon book, the Client system may be programmed to automatically provide the electronic coupon or coupon book to a peripheral printing device such that the User has automatic access to hard-copy versions of the coupons.

As one having ordinary skill in the art will appreciate, the use of the client system will typically be operated or otherwise controlled by a consumer or a customer (in business to business transactions) and the server system or systems will be operated or otherwise controlled by an organization or an agent of an organization authorized to enter into and complete the transaction. In addition, as one having ordinary skill will appreciate the entire process and system can be automated, for example whereby a client system is programmed to periodically visit websites (whether or not known to the source of electronic coupons) or the originating server can be programmed to periodically distribute electronic coupons, such as by electronic mail, and the redeeming server can be programmed to automatically redeem the electronic coupon as part of an automated request to initiate a transaction received from an automated client system. One of ordinary skill in the art will also appreciate that the electronic coupons can include an expiration date or a window of dates when the electronic coupon is valid or effective.

In another embodiment of the invention, Cookies are transferred to, or retrieved from, a client system by a frame spawned within a primary website by JavaScript or other similar software code. This embodiment is compatible with security features included with some web browsers that limit a website to depositing and retrieving Cookies only for itself. For example, a user visiting a highly trafficked website generally receives a Cookie from that site, but a user cannot receive a cookie from a site on behalf of another site. This is because a Cookie deposited by a particular website is encoded with a signature corresponding to that website, and the browser utilizes that signature to limit Cookie transfers to only the website that created the Cookie. However, a frame spawned within the highly trafficked website can deposit a Cookie on the Client system, and a similar frame spawned within another website can subsequently read that Cookie, as long as the frames spawned on different websites look the same (i.e., have the same signature) to the browser running on the Client system. As with the other embodiments described herein, the Cookie may contain all of the necessary coupon information, including the complete coupon data structure necessary for benefits identification, validation and authentication, or the Cookie may contain only data identifying the Client, so that the Cookie functions as a pointer to a database on a coupon clearinghouse server. If the Cookie contains the complete data structure, the script will include the code necessary to authenticate and validate the coupon. The utility of this embodiment lies in the fact that the issuer and the redeemer of the coupon need not be the same entity. For example, a producer of goods may desire to have coupons distributed to potential purchasers, but may not desire to conduct the electronic commerce necessary to redeem the coupons. In this case, the producer of goods would distribute the JavaScript (or other similar script) for generating coupon-distributing website frames to highly trafficked websites. The producer of goods would also provide the frame-generating script to point-of-sale product retailers so that the coupons could be redeemed where the product is sold. In other embodiments of the invention, the highly trafficked advertising website and the point of sale, redeeming website may be the same website. In other embodiments, the website from which the user acquires coupons or coupon pointer information may include the clearinghouse system directly, i.e., the user need not visit a website separate from the clearinghouse.

Figure 103:
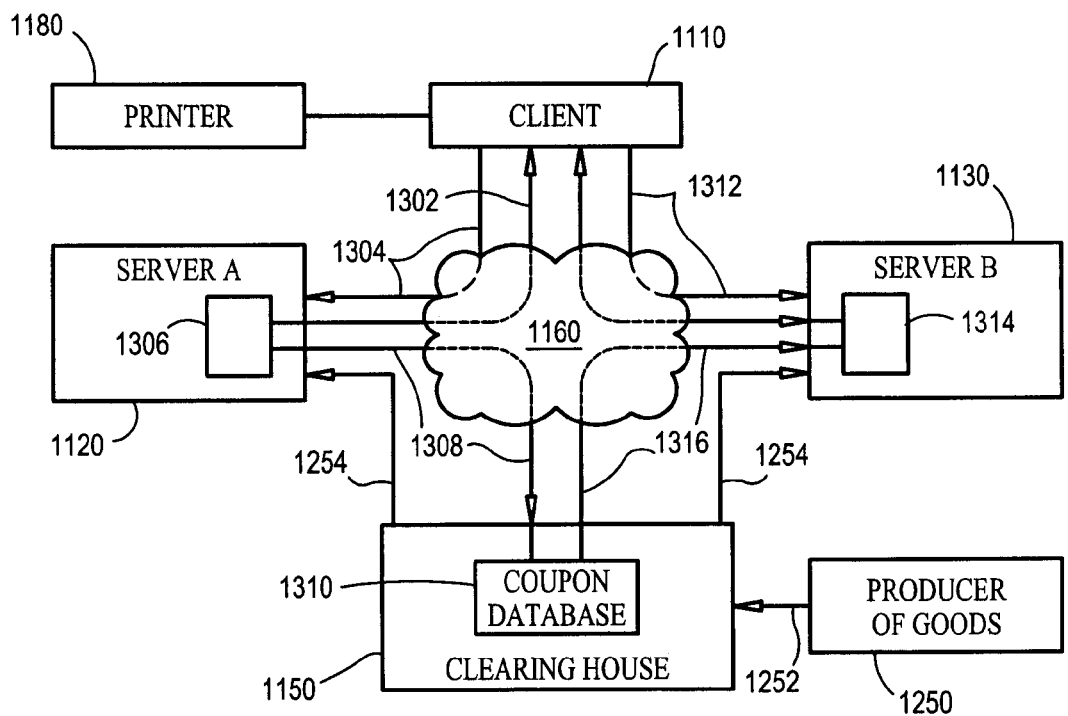
FIG. 103 is a diagrammatic view of another embodiment of the system of FIG. 101.
Figure 104:
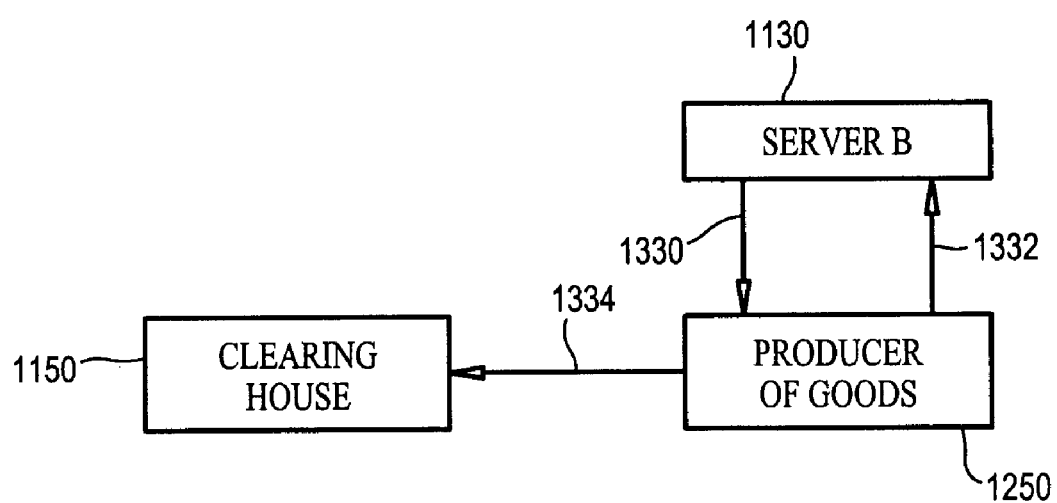
FIG. 104 is a diagrammatic view of the reimbursement procedure of one embodiment of the system of FIG. 103; and, FIG. 105 is a diagrammatic view of the reimbursement procedure of another embodiment of the system of FIG. 103.
Figure 105:
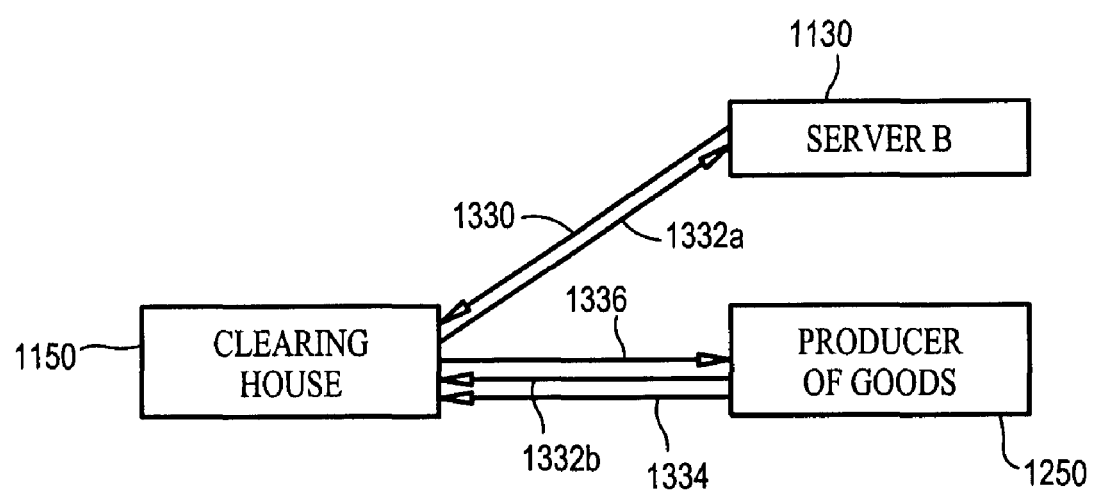

The preceding embodiment of the invention may be implemented by a single service provider such as the entity responsible for the coupon clearinghouse server 1150. In this scenario, illustrated in FIG. 103, the producer of goods 1250 authorizes 1252 the clearinghouse 1150 to generate and distribute electronic coupons related to the relevant goods. The clearinghouse 1150 produces and distributes the necessary frame-generating script 1254 to the highly trafficked websites (i.e., the advertising websites) and to the point of sale websites (the coupon redeeming websites). A user operating a Client system 1110 initiates a connection 1302 to the one of the advertising websites (Server A 1120) and receives a Cookie 1304 from the frame 1306 spawned by the script. If the coupon is to be stored on a clearinghouse database, the advertising website establishes a connection 1308 to the clearinghouse 1150 to store coupon information associated with the Client 1110 into the clearinghouse coupon database 1310. In a preferred embodiment of the invention, the aforementioned distribution of coupons is not dependent upon any characteristics of the Client 1110 (e.g. demographics, purchasing habits etc.), although other embodiments may utilize such information to selectively distribute particular coupons to specific Clients. The user subsequently initiates a connection 1312 to one of the coupon redeeming websites (Server B 1130), and the frame 1314 spawned by the resident script retrieves the Cookie that contains either the complete coupon data structure or the Client data that points to the clearinghouse database. If the coupon has been stored on the clearinghouse database 1310, the redeeming website 1130 establishes a communications link 1316 to the clearinghouse 1150 and retrieves coupon information associated with the Client 1110. The redeeming website 1130 then authenticates the coupon, either internally based on the information embedded in the coupon, or via the connection 1316 to the clearinghouse 1150. The redeeming website 1130 then modifies the transaction with the Client 1110 by an amount defined by the coupon. As with conventional paper-based coupons, the redeeming entity (corresponding to the redeeming website 1130) is reimbursed for the amount of the transaction modification in addition to a processing fee. The redeeming entity 1130 may receive the reimbursement and fee from the producer of goods 1250 directly, or from the clearinghouse 1150. In the former case (shown in FIG. 104), upon notification 1330 of the transaction from the redeeming entity 1130, the redeeming entity receives the reimbursement and fee 1332 from the producer of goods 1250, and the clearinghouse 1150 receives a fee 1334 from the producer of goods 1250 for each coupon redeemed. In the latter case (shown in FIG. 105), upon notification from the redeeming entity 1130, the redeeming entity 1130 receives the reimbursement and fee 1332a from the clearinghouse, the clearinghouse notifies the producer of goods of the transaction, and the producer of goods reimburses the clearinghouse for the amount of the modification and the fee 1332b that the clearinghouse paid to the redeeming entity, in addition to a providing a fee 1334 to the clearinghouse for the redeemed coupon.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A system for managing promotions over a network comprising:
   a promotion server system including a computer processor and associated datastore, said datastore containing data comprising terms and statistics of item promotions and electronic tokens;
   a commercial server system including a computer processor and associated commercial datastore, said commercial datastore containing data comprising terms and statistics of item promotions and electronic tokens, and
   a client server system including a computer processor and associated client datastore, said client datastore containing data comprising terms and statistics of item promotions and electronic tokens;
   wherein said commercial server system further includes a script for generating a website frame having a predetermined signature, such that a cookie deposited by said website frame is encoded with said predetermined signature, and said predetermined signature corresponds to said website frame;
   wherein said commercial server system is programmed to provide said electronic token to said client server system, such that said electronic token uniquely corresponds to said predetermined signature;
   wherein said commercial server system is programmed to distribute said website frame over said network to said promotion server system;
   wherein said client server system is programmed to connect to said promotion server system over said network;
   wherein said promotion server system is programmed to transmit said electronic token from said website frame over said network to said client server system; and
   wherein said promotion server system is programmed to transmit over said network to said commercial server system coupon information associated with the client received from said electronic token;
   wherein said promotion server system further includes code for providing, to said commercial server system, promotion data, said promotion data comprising terms and statistics of item promotions, electronic tokens, and purchase transaction data.

2. The system of claim 1, wherein said promotion server includes code for varying the terms of said promotions based on said promotion data.

3. The system of claim 2, wherein said varying is based on the percentage of redemption of said promotions.

4. The system of claim 2, wherein said varying is based on one of: said promotions issued, said promotions viewed, and said promotions redeemed.

5. The system of claim 2, wherein said varying is performed automatically, according to predetermined ranges.

6. The system of claim 2, wherein said varying is performed in real time.

7. The system of claim 1, wherein said promotion server includes code for sending rebate information to the consumer based on said promotion data.

8. The system of claim 1, wherein said promotion server includes code for processing a rebate based on said promotion data.

9. The system of claim 8, wherein said processing is done while the consumer is still at the point of sale.

10. The system of claim 1, wherein said providing is done in real time.

11. The system of claim 1, wherein said promotion server system further includes authorization code for enabling said commercial server system to accept or decline said promotions;
wherein said promotions are redeemable at more than one different retail chain.

12. The system of claim 1, wherein said promotion server system further includes authorization code for enabling said commercial server system to accept or decline said promotions;
wherein said commercial server system may be accessed by a manufacturer.

13. The system of claim 1, wherein said statistics include data comprising the number of promotions redeemed or the value of the redeemed promotions.

14. The system of claim 1, wherein said promotion data is transferred to said commercial server system in the form of screen display data.

15. A system for managing promotions over a network comprising:
an promotion server;
a retailer's commercial server;
a consumer's client computer;
wherein said advertiser's promotion server; said retailer's commercial server; and said consumer's client computer are operably connected to the Internet, and are structured and programmed so that:
said consumer's client computer can request from said retailer's commercial server a promotion;
said retailer's commercial server responds to requests from said consumer's client computer for said promotion by automatically obtaining from said promotion server promotion authorization data for said promotion, and said retailer's commercial server determining from said authorization data whether to accept or decline said promotion; and
wherein said determining includes authenticating said promotion and verifying that said promotion has not expired.

16. The system of claim 15 wherein said retailer's commercial server selecting a promotion accounting report option, wherein said promotion server transfer transfers screen display data to said retailer's commercial server system that provides said retailer's commercial server system with statistics that include the dollar value of promotions redeemed by said consumer's client computer.

17. The system of claim 15 wherein said retailer's commercial server is configured to determine the authentication of said promotion after said consumer's client computer initiates a transaction with said retailer's commercial server.

18. The system of claim 15 wherein said retailer's commercial server is configured to determine the authentication of said promotion prior in time to said consumer's client computer redeeming said promotion.

* * * * *